Sept. 19, 1944.    A. F. GREINER    2,358,505
UNIVERSAL JOINT
Original Filed Feb. 3, 1941
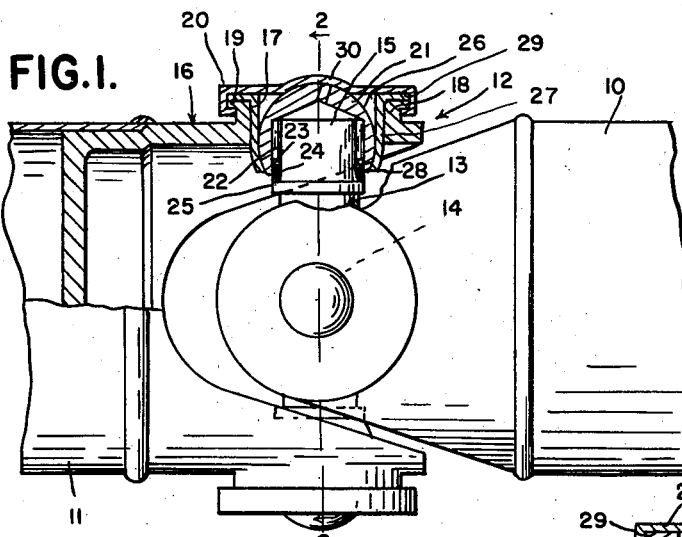
FIG.1.
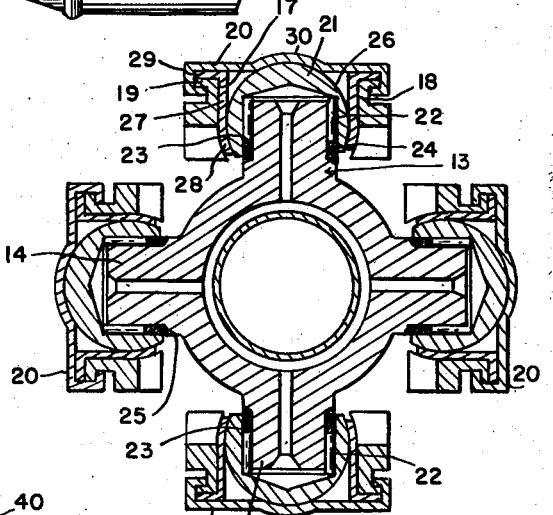
FIG.2.
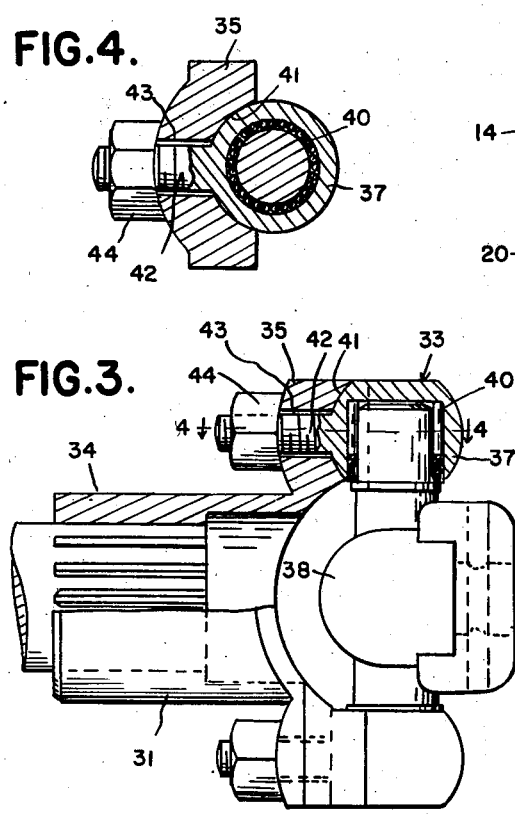
FIG.4.
FIG.3.
INVENTOR.
ANTON F. GREINER
BY
*Whittemore Hulbert & Belknap*
ATTORNEYS Patented Sept. 19, 1944

2,358,505

UNITED STATES PATENT OFFICE 2,358,505

UNIVERSAL JOINT

Anton F. Greiner, Detroit, Mich.

Original application February 3, 1941, Serial No. 377,259, now Patent No. 2,328,139, dated August 31, 1943. Divided and this application July 6, 1942, Serial No. 449,937

6 Claims. (Cl. 64—17)

This invention relates generally to torque transmitting mechanism and refers more particularly to improvements in torque transmitting universal joints. The present invention is a division of my copending application, Serial No. 377,259, filed February 3, 1941, now Patent No. 2,328,139, issued August 31, 1943.

One type of universal joint which has achieved considerable recognition in the trade for transmitting torque between relatively angularly movable driving and driven members comprises a yoke having two pairs of journals. The journals of one pair extend radially outwardly from diametrically opposite sides of the yoke and are respectively connected to the driving member through the medium of bearings. The other pair of journals extends radially outwardly from diametrically opposite sides of the yoke between the journals of the first pair and are respectively connected to the driven member through the medium of bearings carried by the latter. The bearings usually include needle roller bearings located between the journals and adjacent surfaces of the bearings.

In universal joints of the above type, both the bearings and the journals are rigidly fixed with respect to each other. As a result, the angle of deflection of the journals has a positive value under torque load, and the angle of deflection of the bearings is, of course, zero under all torque conditions. This difference between the angle of deflection of the journals and the angle of deflection of the bearings under torque load subjects the needle bearings to adverse force moments which tends to change the normal line contact of the rollers with the journals to a point contact. Accordingly, the needle bearing rollers dig into the hardened journals and produce indentations in the latter of such depth as to cause failure of the joint. As a matter of fact, many automobile accidents can be traced to failure of the universal joints and, therefore, it is important to eliminate the causes of such failures.

It is one of the principal objects of this invention to overcome the above objections by providing a torque transmitting device constructed in such a manner that torsional stresses and other adverse force moments are reduced to a minimum. According to this invention, the above is accomplished by providing a bearing and journal capable of relative movement under torque load in directions to permit one to follow the movements and deflections of the other regardless of the nature of the load conditions.

Another object of this invention is to provide a torque transmitting universal joint of the general type set forth above wherein the angle of deflection of the journals equals the angle of deflection of the bearings for the journals, irrespective of the nature of the torque load. As a result, a line contact of the needle bearing rollers with the journals is insured under all torque conditions, and the damaging indentations in the journals, previously referred to, are eliminated.

A further feature of this invention is to provide a torque transmitting device composed of a relatively few simple parts capable of being readily assembled and connected to the driving and driven members.

The foregoing, as well as other objects, will be made more apparent as this description proceeds, especially when considered in connection with the accompanying drawing, wherein:

Figure 1 is a side elevational view partly in section of a torque transmitting device constructed in accordance with this invention;

Figure 2 is a cross sectional view taken substantially on the plane indicated by the line 2—2 of Figure 1;

Figure 3 is a side elevational view of a slightly modified form of the invention; and Figure 4 is a sectional view taken on the line 4—4 of Figure 3.

Although a number of the principles of the present invention may be advantageously used in connection with various different types of torque transmitting devices, nevertheless, the invention is particularly applicable to torque transmitting universal joints and, accordingly, I have selected this embodiment of the invention for the purpose of illustration.

In Figures 1 and 2 of the drawing, I have shown a tubular drive shaft 10 and a tubular driven shaft 11 operatively connected by means of a universal joint 12 constructed to effectively transfer torque from the driving shaft 10 to the driven shaft 11 regardless of the angular positions of these shafts with respect to each other. In detail it will be noted that the universal joint 12 is provided with a yoke 13 having two pairs of journals 14 and 15 respectively. The journals 14 extend radially outwardly from diametrically opposite sides of the body portion of the yoke and have a common axis perpendicular to the axis of rotation of the yoke. The journals 15 extend radially outwardly from diametrically opposite sides of the body portion of the yoke between the journals 14 and have a common axis perpendicular to the axis of the journals 14.

In the present instance, the journals 14 on the yoke are operatively connected to the driving shaft 10 and the journals 15 are similarly connected to the driven shaft 11 so that torque is transmitted from one shaft to the other through the yoke. In detail, the journals 14 and 15 are respectively connected to the tubular drive and driven shafts by means of cup-shaped stampings 16. The two stampings are identical in construction and each stamping is formed with diametrically opposed openings 17 therethrough for respectively receiving the journals 14 and 15. Each opening 17 is surrounded by a radially outwardly extending flange 18 formed integral with the respective stampings 16 and terminating at the radially outer end in a laterally outwardly extending annular flange 19. The flanges 19 cooperate with the respective stampings 16 to form annular grooves concentric with the axes of the respective openings 17. Each opening 17 is closed by means of a cap 20 in the form of a sheet metal stamping having the marginal edges crimped around the respective flanges 19 and extending into the associated annular grooves.

The journals on the yoke 13 respectively extend into the openings 17 in the stampings 16 and are operatively connected to the respective stampings for universal displacement relative thereto by means of bearings 21. The bearings 21 are respectively bored to receive the journals and the internal diameter of the bores exceeds the external diameter of the journals by an amount sufficient to enable the insertion of needle bearings 22 between the adjacent surfaces of the journals and bores. The needle bearings 22 are maintained in the respective bores of the bearings by means of a retainer ring 23 secured in the respective bores at the radially inner ends of the needle bearings. A suitable lubricant packing 24 is also respectively located in the radially inner ends of the bearings between the retaining rings 23 and suitable shoulders 25 respectively formed on the journals.

In accordance with this invention, the bearings 21 are mounted on the respective stampings 16 in a manner which enables sufficient unrestrained universal movement of the bearings during transmission of torque to maintain the axis of the bore in each bearing coincident with the axis of the associated journal regardless of deflection of the journal under torque loads. In other words, the bearings 21 are free to follow their respective journals regardless of any deflection of the journals under torque load and this is advantageous because it insures maintaining the axes of the needle bearings parallel to the axis of the associated journal during torque transmission. It follows, therefore, that cocking of the needle bearings and the resulting brinelling of the journals is prevented.

The foregoing is accomplished herein by forming each bearing 21 with a spherically shaped exterior surface 26 and by providing correspondingly shaped surfaces on the respective stampings for engagement with the bearings. In detail, a retainer sleeve 27 preferably of sheet metal is pressed or otherwise secured in each of the openings 17. The radially inner ends 28 of the sleeves are respectively shaped to correspond to the spherical exterior surfaces 26 on the bearings 21 and have a bearing engagement with the latter surfaces. The radially outer ends of the sleeves are respectively formed with laterally outwardly extending flanges 29 which seat against the flanges 19 and are clamped against the latter by the caps 20. As shown in both Figures 1 and 2, the caps 20 are shaped to provide spherical surfaces 30 for engagement with the radially outer portions of the bearings 21. It follows from the above that the bearings 21 are universally adjusted relative to their respective stampings 16 and, at the same time, cooperate with the journals to transmit torque from one stamping to the other.

The embodiment of the invention shown in Figures 3 and 4 differs from the above modification in the manner in which the bearings are mounted to enable the desired universal movement thereof. Referring more in detail to Figure 3, the reference character 31 indicates a drive shaft and the reference character 32 indicates a driven shaft. The two shafts are operatively connected together by a universal joint designated generally by the reference character 33 and comprising a yoke which is identical to the yoke 13 previously described in connection with the first embodiment of this invention. In the present instance, the journals 14 on the yoke are connected to the drive shaft 31 by means of a coupling 34 splined on the drive shaft and having diametrically opposed radially extending ears 35. The journals 15 on the yoke are respectively connected to the driven shaft 32 by means of a head 36. The journals 14 are respectively connected to the coupling 34 by means of bearings 37 and the journals 15 are respectively connected to the head 36 by bearings 38. Inasmuch as the bearings are identical in construction and in view of the fact that these bearings are connected to their respective supports in the same manner, only one bearing need be described in detail.

Upon reference to Figure 4 it will be noted that the bearing is in the form of a radially inwardly opening cup-shaped cap having an internal diameter sufficient to receive one of the journals. In fact, the internal diameter of the cap exceeds the external diameter of the journal by an amount sufficient to enable the insertion of needle bearings 40 between adjacent surfaces of the journal and bearing. The external surface of the cap or bearing is spherically shaped and is adapted to seat in a correspondingly shaped socket 41 formed in the adjacent support which is indicated in Figure 3 as one of the ears 35.

It will also be noted from Figure 3 that the bearing is provided with a laterally projecting stud 42 which extends through an enlarged opening 43 in the ear 35 and is threaded for engagement with a nut 44. The adjacent surfaces of the nut 44 and the ear 35 correspond in shape to the seat 41 and the nut is maintained sufficiently loose on the stud to enable relatively free universal movement of the bearing relative to the ear 35. Thus, it will be observed that the construction shown in Figures 3 and 4 also enables the bearing to automatically adjust itself under torque loads to compensate for any deflection of the journal.

What I claim as my invention is:

1. In a torque transmitting device, a revoluble member having a journal extending outwardly therefrom, a second revoluble member having an opening therethrough for receiving the journal, means for transmitting torque from one member to the other including a bearing positioned in the opening in the second member and having a bore receiving said journal, said bearing having a spherically shaped external surface, a retainer having a sleeve secured in said opening and having a spherically shaped inner end portion engaging the spherically shaped surface of the bearing adjacent the inner end of the bore in the latter, and a cap for the opening in the second member operable to secure the sleeve to said second member and having a spherical portion engaging the adjacent spherical surface of the bearing in a manner to coact with the sleeve in permitting universal adjustment of the bearing during the transmission of torque from one member to the other.

2. In a torque transmitting device, a rotatable member having a tubular end portion, a cup-shaped member having the closed end portion sleeved into the tubular portion of the rotatable member and secured thereto, a torque transmitting element having a journal extending radially through an opening in one side wall of the cup-shaped member, a bearing located in the opening formed in the side wall of the cup-shaped member and having a bore for receiving said journal, said bearing having a spherically shaped outer surface portion, and a retainer sleeved in the opening in the cup-shaped member and having a spherically shaped portion engaging the spherically shaped portion of the bearing to support the latter on the cup-shaped member for rocking movement.

3. In a torque transmitting device, a rotatable member having a tubular portion provided with an opening through one side wall thereof, a bearing having a spherically shaped exterior surface portion and having a radially inwardly opening bore, a torque transmitting element having a journal extending into the bore, and a retainer sleeved in the opening in the rotatable member and having a spherically shaped portion engaging the spherically shaped surface of the bearing to support the latter on the rotatable member for rocking movement relative thereto.

4. In a torque transmitting device, a rotatable member having a tubular portion provided with an opening therethrough, a bearing positioned in the opening and having a spherically shaped outer surface, a torque transmitting element having a journal extending into a radially inwardly opening bore in the bearing, a retainer sleeve secured in said opening and having a spherically shaped portion engaging the spherically shaped surface of the bearing, and a cap for securing the retainer sleeve to the rotatable member and having a spherically shaped portion also engaging the spherically shaped surface of the bearing and cooperating with the retainer sleeve to permit rocking movement of the bearing relative to the rotatable member in response to deflection of the journal under torque loads.

5. In a self aligning universal joint of the four trunnion type, a bearing assembly comprising a member having an opening, a trunnion projecting into the opening, a ball element in the opening and having a diametrically extending bore receiving the trunnion, an adapter in the opening around the ball and having a cylindrical inner surface and an end wall engaging the ball and means holding the adapter in the opening.

6. In a torque transmitting device, the combination of a bifurcated member having aligned openings in the furcations thereof, a cross member engageable between said furcations and having radially outwardly extending journals projecting into said openings and bearings for said journals engageable therewith from outside said furcations, each comprising a spherical member having a cylindrical recess for engaging the journal, a retainer for said spherical member provided with a segmental spherical bearing therefor on the inner side of the center of the sphere, said retainer external fitting said opening and a cap member forming an outer bearing for said spherical member, said cap member having an interlocking engagement with the furcation to retain the bearing from outward displacement.

ANTON F. GREINER.